(12) United States Patent
Gale (10) Patent No.: US 11,146,386 B2
(45) Date of Patent: Oct. 12, 2021

(54) METHOD AND SYSTEM FOR AUTHENTICATION SEAL DEPLOYMENT IN NETWORKED IMMUTABLE TRANSACTIONS

(71) Applicant: AGILE BLOCKCHAIN CORP., Vancouver (CA)

(72) Inventor: Joshua Gale, Toronto (CA)

(73) Assignee: AGILE BLOCKCHAIN CORP., Vancouver (CA)

( * ) Notice: Subject to any disclaimer, the term of this patent is extended or adjusted under 35 U.S.C. 154(b) by 119 days.

(21) Appl. No.: 16/745,664

(22) Filed: Jan. 17, 2020

(65) Prior Publication Data

US 2021/0226771 A1 Jul. 22, 2021

(51) Int. Cl.
*H04L 9/06* (2006.01)
*H04L 9/08* (2006.01)

(52) U.S. Cl.
CPC .......... *H04L 9/0643* (2013.01); *H04L 9/0819* (2013.01); *H04L 2209/38* (2013.01)

(58) Field of Classification Search
CPC .. H04L 9/0643; H04L 9/0819; H04L 2209/38
See application file for complete search history.

(56) References Cited

U.S. PATENT DOCUMENTS

| | | | | |
|---|---|---|---|---|
| 10,404,471 B1 * | 9/2019 | Griffin | .................. | H04L 9/0637 |
| 10,447,483 B1 * | 10/2019 | Su | ......................... | H04L 9/0643 |
| 10,554,407 B1 * | 2/2020 | Greco | .................... | G06F 16/178 |
| 10,585,882 B1 * | 3/2020 | Lintilhac | ................. | G06F 21/64 |
| 10,789,215 B1 * | 9/2020 | Tian | ..................... | G06F 16/1805 |
| 2017/0257358 A1 * | 9/2017 | Ebrahimi | .............. | G06F 21/645 |
| 2018/0109516 A1 * | 4/2018 | Song | ..................... | H04L 9/3268 |
| 2019/0236560 A1 * | 8/2019 | Song | ...................... | G06Q 20/06 |
| 2019/0334700 A1 * | 10/2019 | Callan | ................. | G06F 21/6209 |
| 2020/0036533 A1 * | 1/2020 | Soundararajan | ...... | H04W 12/61 |
| 2020/0042958 A1 * | 2/2020 | Soundararajan | ....... | G06Q 20/06 |
| 2021/0042744 A1 * | 2/2021 | Zheng | .................. | H04L 9/0825 |
| 2021/0081396 A1 * | 3/2021 | Tian | ..................... | G06F 3/0685 |

* cited by examiner

*Primary Examiner* — Darren B Schwartz (57) ABSTRACT

Computer-implemented method and system of generating an authentication seal. The method includes receiving, at a memory of an authentication agent server computing device, a data record submittal from a client agent having an associated client signing key and a client verification key, the data record submittal including at least an identifier (R-ID) and at least one of a data record and a record hash (R-HSH) of the data record, the R-ID being uniquely associated with the data record; associating, using the one or more processors, the at least one of the data record, the R-ID, the R-HSH and a client signature with a unique identifier (B-ID) of a location within an immutable storage medium, the client signature based on at least one of the client signing key and the client verification key; and generating, using the one or more processors, an authentication seal based at least in part upon the at least one of the data record and the R-ID, the R-HSH and the B-ID.

17 Claims, 4 Drawing Sheets

Receiving, at a memory of an authentication agent server computing device, a data record submittal from a client agent having an associated client signing key and a client verification key, the data record submittal including at least an identifier (R-ID) and at least one of a data record and a record hash (R-HSH) of the data record, the R-ID being uniquely associated with the data record

310

---

Associating, using the one or more processors, the at least one of the data record, the R-ID, the R-HSH and a client signature with a unique identifier (B-ID) of a location within an immutable storage medium, the client signature based on at least one of the client signing key and the client verification key

320

---

Generating, using the one or more processors, an authentication seal based at least in part upon the R-ID, the R-HSH and the B-ID

```
┌─────────────────────────────────────────────────────────────────┐
│ ┌─────────────────────────────────────────────────────────────┐ │
│ │ Receiving, at a memory of an authentication agent server   │ │
│ │ computing device, a data record submittal from a client    │ │
│ │ agent having an associated client signing key and a client │ │
│ │ verification key, the data record submittal including at   │ │
│ │ least an identifier (R-ID) and at least one of a data      │ │
│ │ record and a record hash (R-HSH) of the data record, the   │ │
│ │ R-ID being uniquely associated with the data record    310 │ │
│ └─────────────────────────────────────────────────────────────┘ │
│                              │                                  │
│                              ▼                                  │
│ ┌─────────────────────────────────────────────────────────────┐ │
│ │ Associating, using the one or more processors, the at least│ │
│ │ one of the data record, the R-ID, the R-HSH and a client   │ │
│ │ signature with a unique identifier (B-ID) of a location    │ │
│ │ within an immutable storage medium, the client signature   │ │
│ │ based on at least one of the client signing key and the    │ │
│ │ client verification key                                320 │ │
│ └─────────────────────────────────────────────────────────────┘ │
│                              │                                  │
│                              ▼                                  │
│ ┌─────────────────────────────────────────────────────────────┐ │
│ │ Generating, using the one or more processors, an           │ │
│ │ authentication seal based at least in part upon the at     │ │
│ │ least one of the data record and the R-ID, the R-HSH and   │ │
│ │ the B-ID.                                              330 │ │
│ └─────────────────────────────────────────────────────────────┘ │
│                                                             300 │
└─────────────────────────────────────────────────────────────────┘
                               │
                               ▼
┌─────────────────────────────────────────────────────────────────┐
│ Transmitting the authentication seal back to the client agent  │
│ for at least one of storage and verification                   │
│                                                            410 │
└─────────────────────────────────────────────────────────────────┘
                               │
                               ▼
┌─────────────────────────────────────────────────────────────────┐
│ Receiving, from the client agent, an audit request in          │
│ verification of the authentication seal in association with    │
│ the data record.                                               │
│                                                            420 │
└─────────────────────────────────────────────────────────────────┘
```

FIG. 4

METHOD AND SYSTEM FOR AUTHENTICATION SEAL DEPLOYMENT IN NETWORKED IMMUTABLE TRANSACTIONS

TECHNICAL FIELD

The disclosure herein relates to digital data record authentication in immutable transactions.

BACKGROUND

An immutable medium makes use of public and private keys in order to form a digital signature to ensure security. With the property of immutability embedded in blockchain, as an illustrative, non-limiting example of an immutable medium, it becomes easier to detect tampering of any data. Blockchains are considered tamper-proof as any unilateral change in even one single block can be detected. In advancing a transfer, the sender uses their private key and announces the transaction information over the network. In such an example immutable medium, a block, or blockchain node, is created containing information such as digital signature, timestamp, and the receiver's public key. Once the majority of nodes in the network come to a consensus and agree to a common solution, the block is time stamped and added to the existing blockchain. This block can contain data records as the subject of the transfer. After a new block is added to the chain, the existing copies of blockchain are updated for all the nodes on the network. Blockchains are decentralized in nature, with no single person or group having authority to unilaterally enact changes to data records once created. Hashes are used to detect tampering, and each hash associated with a block is unique, so any change in a data record will lead to a detectible change in the hash. However, changes made in collusion amongst two or more parties may present challenges to the immutable medium in preserving integrity of digital data record transactions related thereto. In an illustrative example, in order to subvert a blockchain network, the collusion typically must involve subversion of the consensus mechanism being applied therein.

DETAILED DESCRIPTION

Methods and systems provided herein, among other advantages, enable provision of anti-collusion safeguards by way of a generated authentication seal pertaining to a given digital data record. In particular, solutions provided herein also provide for broadcasting the authentication seal in association with the given data record to members of a network, the broadcast further providing traceability of a given data record as established in an immutable medium.

As referred to herein, immutability means the ability of a transaction medium to remain unchanged in order to sustain non-repudiation of transactions related thereto. In one illustrative and non-limiting example, immutability pertains to a blockchain to remain indelible, such that data in the blockchain cannot be altered. Each block of data record, such as transaction details, proceed in accordance with cryptographic principle or a hash value.

An authentication seal as referred to herein is unique as generated during execution, for instance in a server computing device, of an authentication agent in conjunction with a given data record. The authentication seal as referred to herein further attests that an associated data record, which in some embodiments can be a document or similar data artifact, as deployed to an immutable medium, is verified and acknowledged as authentic. A client originator of the digital data record or document verifies and acknowledges the data record as authentic, in some embodiments.

As referred to herein, an immutable medium includes a subset of storage media characterized by the presumed difficulty, after the fact, of altering or deleting data stored therein. In other words, it is considered infeasible to alter data stored on such immutable media, without invalidating the data or the medium itself. Blockchain, newspapers and Write Once Read Many (WORM) storage media are commonly referenced members of this set.

In accordance with a first example embodiment, provided is a computer-implemented method of generating an authentication seal. The computer-implemented method includes receiving, at a memory of an authentication agent server computing device, a data record submittal from a client agent having an associated client signing key and a client verification key, the data record submittal including at least an identifier (R-ID) and at least one of a data record and a record hash (R-HSH) of the data record, the R-ID being uniquely associated with the data record; associating, using one or more processors, the at least one of the data record, the R-ID, the R-HSH and a client signature with a unique identifier (B-ID) of a location within an immutable storage medium, the client signature based on at least one of the client signing key and the client verification key; and generating, using the one or more processors, an authentication seal based at least in part upon the at least one of the data record and the R-ID, the R-HSH and the B-ID.

In an embodiment, the R-ID comprises a Nonce (Number Used Once) Identifier.

In an embodiment, the B-ID comprises at least one of a unique index, a pointer and an offset to a location within immutable storage medium. The submittal, in embodiments, is represented by data stored, in some representation, at the particular offset in the immutable medium.

In one aspect, the method further comprises transmitting the authentication seal back to the client agent for at least one of storage and verification.

In another embodiment, the method comprises receiving, from the client agent, an audit request in verification of the authentication seal in association with the data record.

In another embodiment, the immutable medium comprises at least one of a private and a public blockchain In accordance with a second example embodiment, provided is a non-transitory storage medium storing a computer usable program product including instructions executable in one or more processors of a server computing device. The instructions, when executed in one or more processors, cause operations comprising receiving, at a memory of an authentication agent server computing device, a data record submittal from a client agent having an associated client signing key and a client verification key, the data record submittal including at least an identifier (R-ID) and at least one of a data record and a record hash (R-HSH) of the data record, the R-ID being uniquely associated with the data record; associating, using the one or more processors, the at least one of the data record, the R-ID, the R-HSH and a client signature with a unique identifier (B-ID) of a location within an immutable storage medium, the client signature based on at least one of the client signing key and the client verification key; and generating, using the one or more processors, an authentication seal based at least in part upon the at least one of the data record and the R-ID, the R-HSH and the B-ID.

In accordance with a third example embodiment, provided is a server computing system comprising one or more processors, one or more computer-readable memories, one or more computer-readable storage devices, and program instructions stored on at least one of the one or more storage devices for execution by at least one of the one or more processors via at least one of the one or more memories. The instructions, when executed in the one or more processors, cause operations comprising receiving, from a client agent having an associated client signing key and client verification key, at a memory of an authentication agent server computing device, a data record submittal including at least an identifier (R-ID) and at least one of a data record and a record hash (R-HSH) of the data record, the R-ID being uniquely associated with the data record; associating, using the one or more processors, the at least one of the data record, the R-ID, the R-HSH and a client signature with a unique identifier (B-ID) of a location within an immutable storage medium, the client signature based on at least one of the client signing key and the client verification key; and generating, using the one or more processors, an authentication seal based at least in part upon the at least one of the data record and the R-ID, the R-HSH and the B-ID.

One or more embodiments described herein provide that methods, techniques, and actions performed by a computing device are performed programmatically, or as a computer-implemented method. Programmatically by way of software applications, as referred to herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory. A server computing device as described herein utilizes processors, memory, and logic instructions stored on computer-readable medium. Embodiments described herein may be implemented in the form of computer processor-executable logic instructions or programs stored on computer memory mediums. In alternative implementations, at least some hardwired logic circuitry, including integrated circuits, may be used in place of, or in combination with, the software logic instructions to implement examples described herein. Thus, the examples described herein are not limited to any particular combination of hardware circuitry and software logic instructions.

SYSTEM DESCRIPTION

Figure 1:
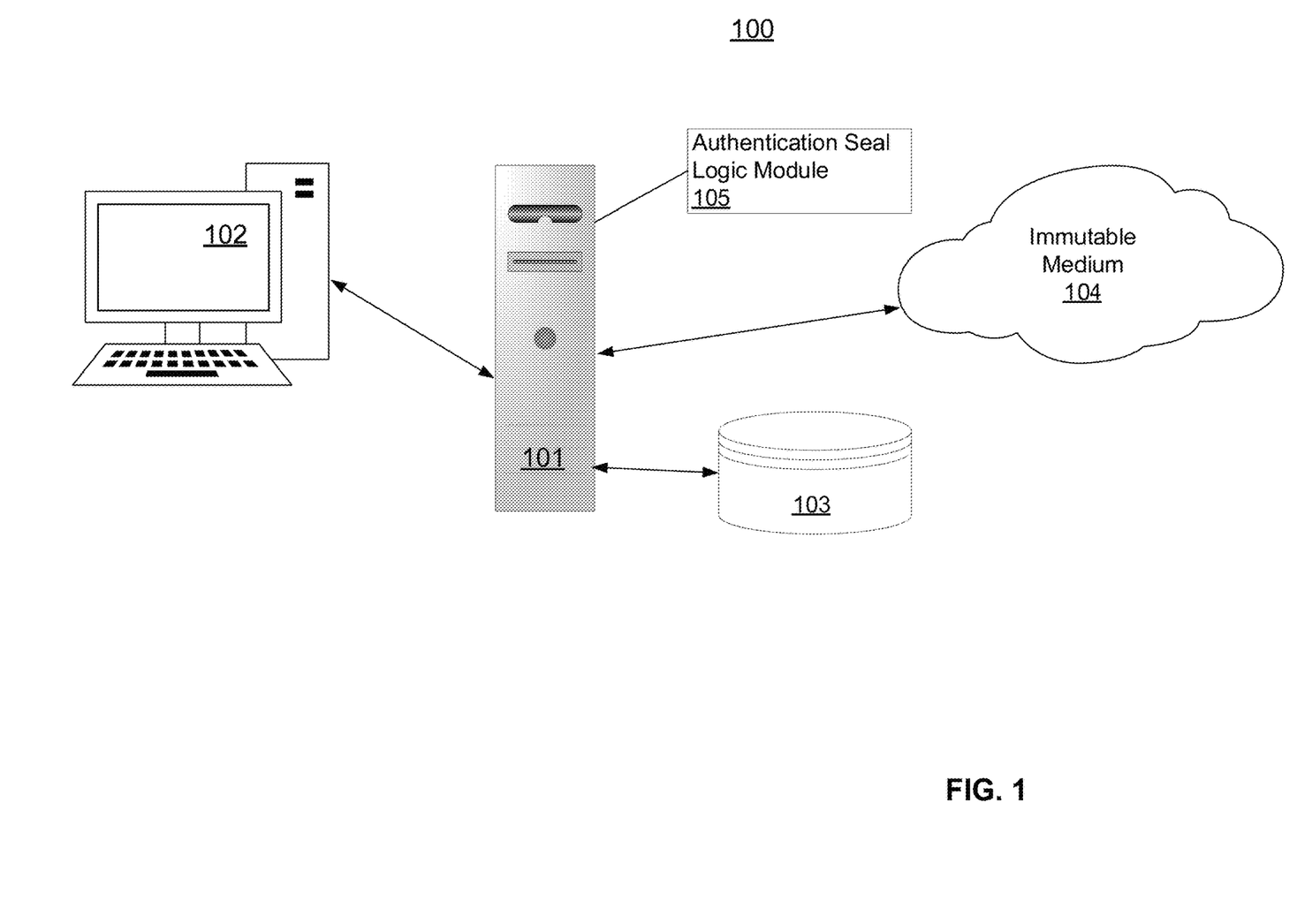
FIG. 1 illustrates, in an example embodiment, a system for generating an authentication seal.

FIG. 1 illustrates, in an example embodiment, system 100 for generating an authentication seal. Server computing system or server device 101, also referred to herein as server 101, includes authentication seal logic module 105 embodied in accordance with computer processor-executable instructions stored within a non-transitory memory. Server 101 is in communication, such as via the Internet in an embodiment, with client computing device 102 and immutable storage medium 104. Database 103 is communicatively accessible to server computing device 101. Client computing device 102 can be such as a desktop or laptop computing device in some embodiments, collectively storing or acquiring data records and their respective associated authentication seals.

Figure 2:
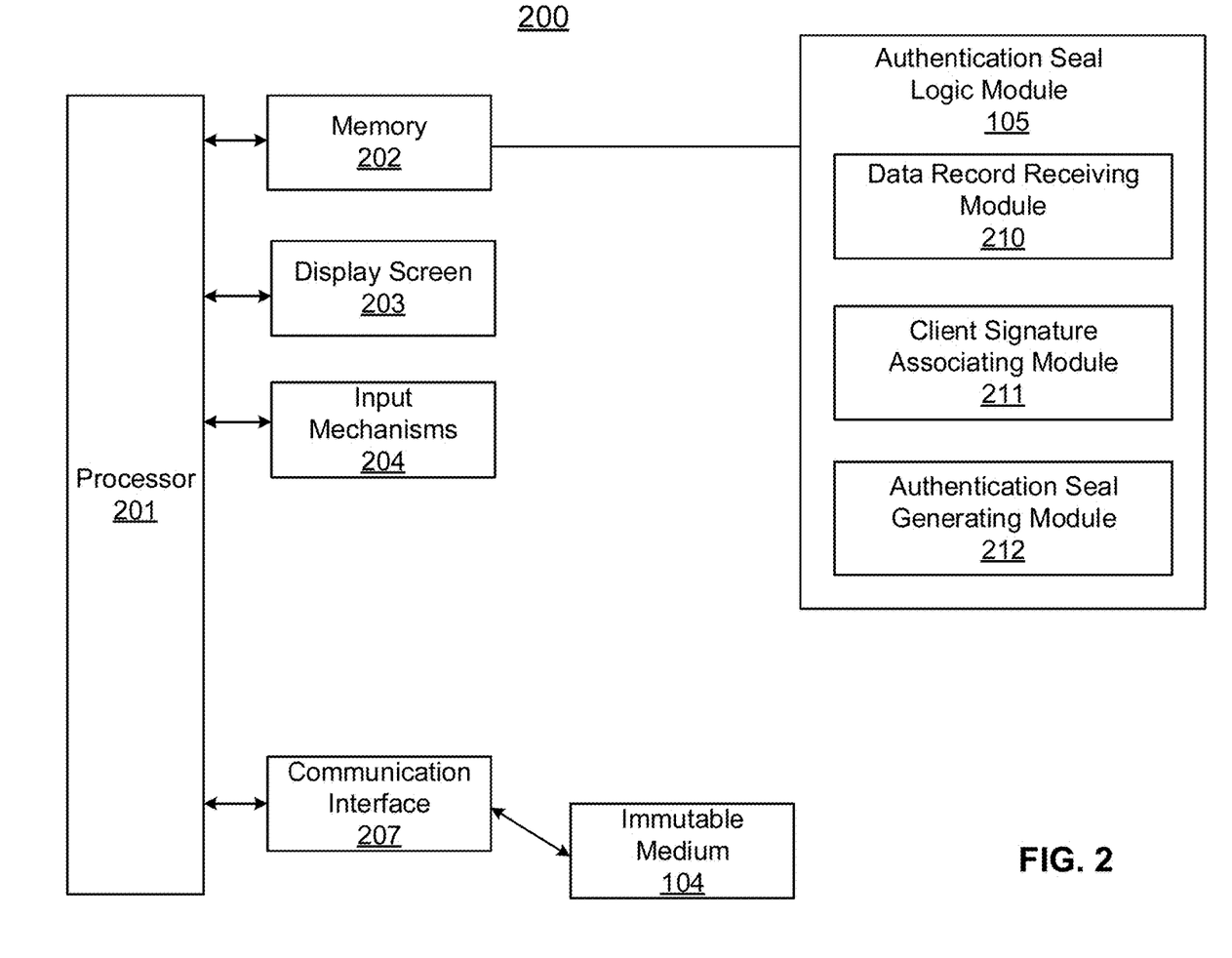
FIG. 2 illustrates, in one example embodiment, an architecture of a server computing device generating an authentication seal.

FIG. 2 illustrates, in one example embodiment, an architecture 200 of a server computing device generating an authentication seal. Server computing system or device 101, also referred to herein as server 101, may include processor 201, memory 202, display screen 203, input mechanisms 204 such as a keyboard or software-implemented touch-screen input functionality, and communication interface 207 communicatively coupled with immutable storage medium 104. Memory 202 may comprise any type of non-transitory system memory, storing instructions that are executable in processor 201, including such as a static random access memory (SRAM), dynamic random access memory (DRAM), synchronous DRAM (SDRAM), read-only memory (ROM), or any combination thereof.

Authentication seal logic module 105 includes processor-executable instructions stored in memory 202 of server 101, the instructions being executable in processor 201. Authentication seal logic module 105 may comprise portions or sub-modules including data record receiving module 210, client signature associating module 211, and authentication seal generating module 212.

Processor 201 uses executable instructions of data record receiving module 210 to receive, at memory 202 of an authentication agent server computing device 105, a data record submittal from a client agent having an associated client signing key and a client verification key, the data record submittal including at least an identifier (R-ID) and at least one of a data record and a record hash (R-HSH) of the data record, the R-ID being uniquely associated with the data record. The data record is sourced from, and submitted by, client computing device 102, in an embodiment. The R-ID uniquely identifies a given data record. In an embodiment, the R-ID can be defined as a Nonce (Number Used Once) Identifier.

Processor 201 uses executable instructions stored in client signature associating module 211 to associate, using the one or more processors, the R-ID, the R-HSH and a client signature with a unique identifier (B-ID) of a location within an immutable storage medium, the client signature based on at least one of the client signing key and the client verification key.

Processor 201 uses executable instructions stored in authentication seal generating module 212 to generate, using the one or more processors, an authentication seal based at least in part upon the at least one of the data record and the R-ID, the R-HSH and the B-ID.

In embodiments, the executable instructions of authentication seal logic module 105 can provide for transmitting the authentication seal back to the client agent for at least one of storage and verification.

In further embodiments, the executable instructions of authentication seal logic module 105 can provide for receiving, from the client agent, an audit request in verification of the authentication seal in association with the data record.

METHODOLOGY

Figure 3:
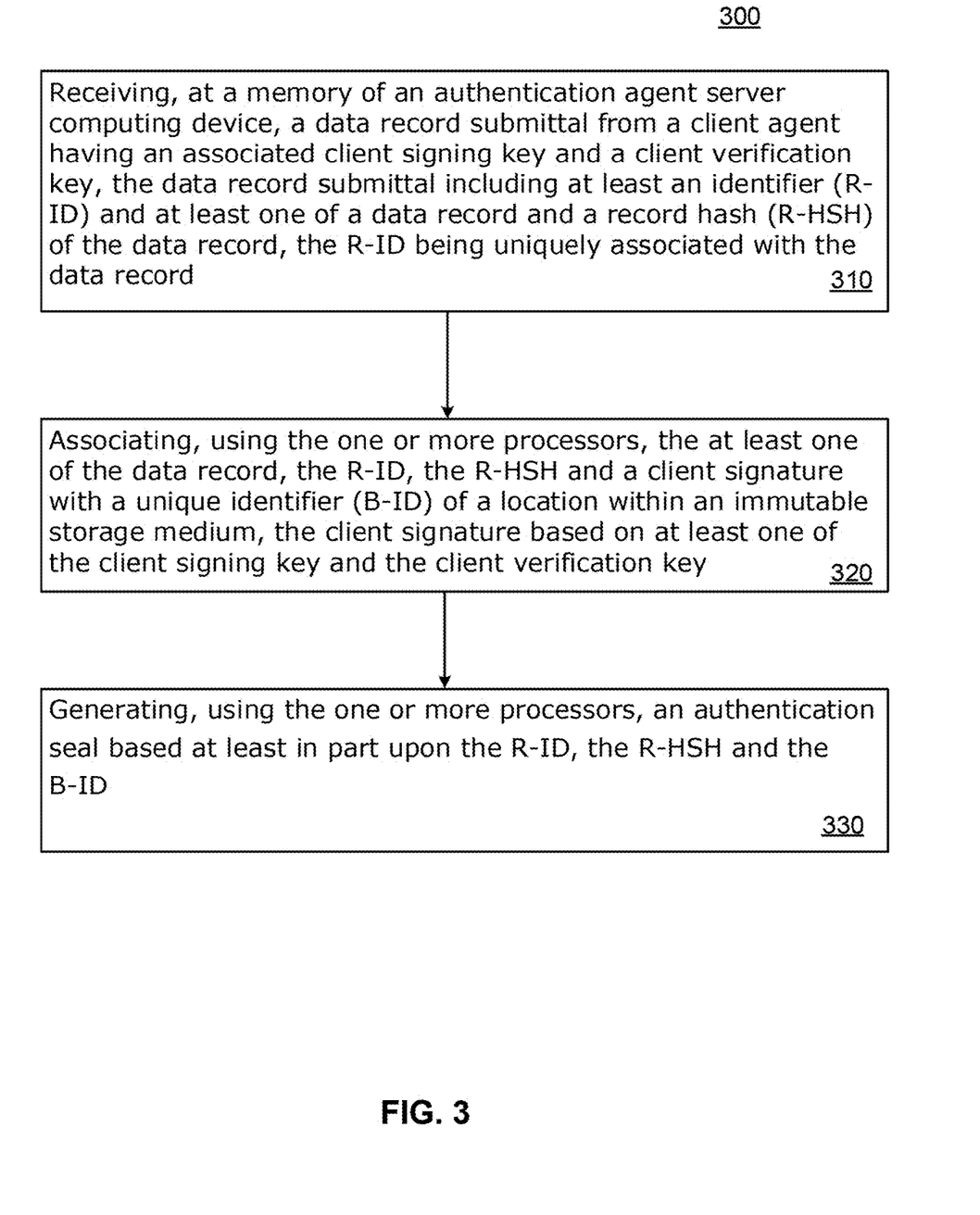
FIG. 3 illustrates a method of operation, in one example embodiment, of a system for generating an authentication seal.

FIG. 3 illustrates a method of operation 300, in one example embodiment, of a system for generating an authentication seal. Method 300 embodiment depicted is performed by one or more processors 201 of server computing device 101. In describing and performing the embodiments of FIG. 3, the examples of FIG. 1 and FIG. 2 are incorporated for purposes of illustrating suitable components or elements for performing a step or sub-step being described.

Examples of method steps described herein relate to the use of server 101 for implementing the techniques described. According to one embodiment, the techniques are performed by authentication seal logic module 105 of server 101 in response to the processor 201 executing one or more sequences of software logic instructions that constitute authentication seal logic module 105.

In embodiments, authentication seal logic module 105 may include the one or more sequences of instructions within sub-modules including data record receiving module 210, client signature associating module 211 and authentication seal generating module 212. Such instructions may be read into memory 202 from machine-readable medium, such as memory storage devices. In executing the sequences of instructions contained in data record receiving module 210, client signature associating module 211 and authentication seal generating module 212 of authentication seal logic module 105 in memory 202, processor 201 performs the process steps described herein. In alternative implementations, at least some hard-wired logic circuitry, including integrated circuits, may be used in place of, or in combination with, the software logic instructions to implement examples described herein. Thus, the examples described herein are not limited to any particular combination of hardware circuitry and software logic instructions.

In embodiments, the client agent's identity (C_VK) is associated to the R-ID and R-HSH and stored locally at client device 102. The R-ID and R-HSH are then published, or broadcasted, by way of cryptographic operations, to the immutable medium. The offset (i.e. exact publication location) of this submittal is further associated to the prior association, resulting in the further association:

C_VK, R-ID, R-HSH, B-ID

This subsequently produced association is then incorporated into a digital signature, and then returned to the submitting client as the authentication seal. In other embodiments, the client agent's identify can be stored at server device 101, or storage medium 103, or some combination thereof, with a representation thereof also being stored in immutable medium 104

At step 310, processor 201 executes instructions of data record receiving module 210 to receive, at a memory of an authentication agent server computing device, a data record submittal from a client agent having an associated client signing key and a client verification key, the data record submittal including at least an identifier (R-ID) and at least one of a data record and a record hash (R-HSH) of the data record, the R-ID being uniquely associated with the data record. The hash, in one embodiment, can be a fixed-length hash, including but not limited to a 16- or 32-byte identifier, since other size configurations may be used. The R-ID uniquely identifies a given data record. In an embodiment, the R-ID can be defined as a Nonce (Number Used Once) Identifier. Further embodiments include a client signature, or some other mechanism whereby the source/author/sender can be deterministically ascertained. In embodiments, R-HSH can refer to any data payload (i.e. the record itself), or any representation of the data such as a cryptographic hash thereof.

At step 320, processor 201 of server computing device 101 executes instructions included in client signature associating module 211 to associate, using the one or more processors, the R-ID, the R-HSH and a client signature with a unique identifier (B-ID) of a location within an immutable storage medium, the client signature based on at least one of the client signing key and the client verification key.

In embodiments, some representation of the digital data record submittal from the client agent is stored at an offset location in the immutable medium. This storage operation can be either a) 'direct', in the sense that a complete copy of the data is stored at the offset in the immutable medium or b) 'representative', in the sense that a reversible transformation of the data is stored on the immutable medium at the offset or c) 'referential', in the sense that what is stored on the immutable medium could only feasibly have been generated by one or more cryptographic operations involving the original submitted data. Thus, in embodiments, the location pointed to, in immutable storage, contains some representation of the submittal from the client agent.

At step 330, processor 201 executes instructions included in authentication seal generating module 212 to generate, using the one or more processors, an authentication seal based at least in part upon the at least one of the data record and the R-ID, the R-HSH and the B-ID.

In embodiments, the R-ID comprises a Nonce (Number Used Once) Identifier.

In some embodiments, the B-ID comprises at least one of a unique index, a pointer and an offset to a location within immutable storage medium.

In other embodiments, a chain of blockchain nodes comprises at least one of a private and a public blockchain, or any combination thereof. A public blockchain is a permissionless database and can be accessed by the public. Private blockchain, in contrast to the public blockchain, are shared only among trusted participants. The rules of a private blockchain can be changed according to different levels of permissions, number of members, and authorization parameters. Private blockchains can run independently or can be integrated with other public and private blockchains also, while being subject to a requisite trust level.

Figure 4:
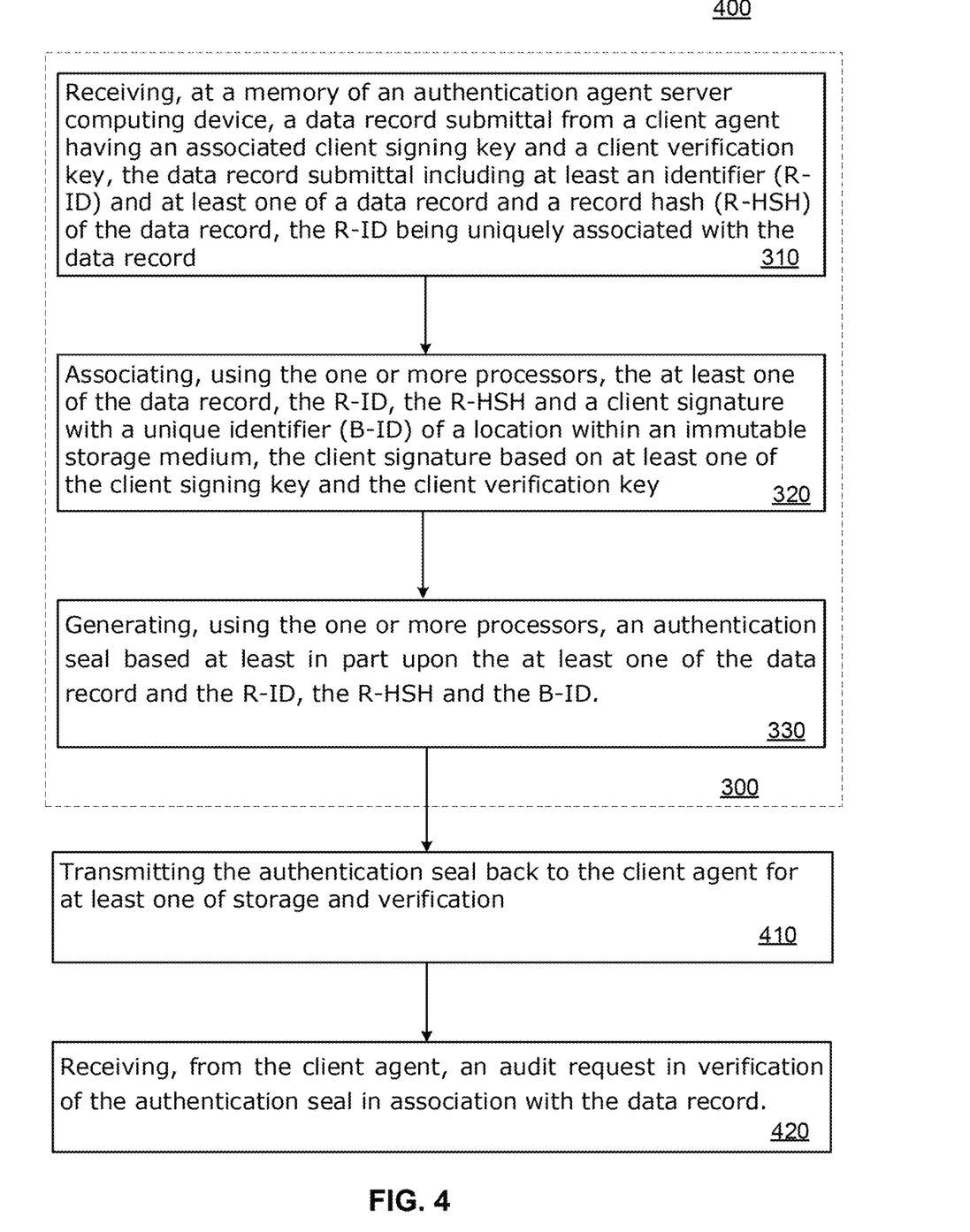
FIG. 4 illustrates a method of operation, in another example embodiment, of a system for generating an authentication seal.

FIG. 4 illustrates a method of operation 400, in another example embodiment, of a system for generating an authentication seal deployable in an immutable medium. The method of operation 400 in the embodiment as depicted is performed in conjunction with method 300 as described in reference to FIG. 3.

At step 410, transmitting the authentication seal back to the client agent for at least one of storage and verification.

At step 420, receiving, from the client agent, an audit request in verification of the authentication seal in association with the data record.

Embodiments of the disclosure herein may also be delivered as part of a service engagement with a business entity. Aspects of these embodiments may include configuring a computer system to perform, and deploying software, hardware, and web services that implement, some or all of the methods described herein. Aspects of these embodiments may also include analyzing a client's operations, creating recommendations based on the analysis, building systems that implement portions of the embodiments disclosed herein, integrating the systems into existing processes and infrastructure, metering usage of the systems, allocating expenses to users of the systems, and billing or invoicing based on usage of the systems.

Embodiments disclosed herein may include a system, a method, and/or a computer program product at any technical detail level of integration. The computer program product may include a computer readable storage medium (or any non-transitory media) having computer readable program instructions thereon for causing a processor to carry out aspects of the embodiments disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, does not constitute transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the embodiments disclosed are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Such computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams of the FIGS. 1-4 herein illustrate the architecture, functionality, and operation of possible implementations of systems, methods, and computer program products according to various embodiments disclosed herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is contemplated that embodiments described herein extend to individual elements and concepts described herein, as well as for embodiments to include combinations of elements recited anywhere in this application. Although embodiments are described in detail herein with reference to the accompanying drawings, it is to be understood that the invention is not limited to only such example embodiments. As such, many modifications and variations will be apparent to practitioners skilled in the art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A computer-implemented method of generating an authentication seal, the computer-implemented process comprising:
   receiving, at a memory of an authentication agent server computing device, a data record submittal from a client agent having an associated client signing key and a client verification key, the data record submittal including at least an identifier (R-ID) and at least one of a data record and a record hash (R-HSH) of the data record, the R-ID being uniquely associated with the data record;
   associating, using one or more processors, at least one of the data record, the R-ID, the R-HSH and a client signature with a unique identifier (B-ID) of a location within an immutable storage medium, the client signature based on at least one of the client signing key and the client verification key; generating, using the one or more processors, an authentication seal based at least in part upon the at least one of the data record and the R-ID, the R-HSH and the B-ID; and
   receiving, from the client agent, an audit request in verification of the authentication seal in association with the data record.

2. The computer-implemented method of claim 1 wherein the R-ID comprises a Nonce (Number Used Once) Identifier.

3. The computer-implemented method of claim 1 wherein the B-ID comprises at least one of a unique index, a pointer and an offset to a location within immutable storage medium.

4. The computer-implemented method of claim 3 further comprising transmitting the authentication seal back to the client agent for at least one of storage and verification.

5. The computer-implemented method of claim 1, wherein the immutable medium comprises at least one of a private and a public blockchain.

6. A computer usable program product comprising one or more computer-readable storage media, and program instructions collectively stored on at least one of the one or more storage media, the program instructions when executed in one or more processors causing operations comprising:
   receiving, from a client agent having an associated client signing key and client verification key, at a memory of an authentication agent server computing device, a data record submittal including at least an identifier (R-ID) and at least one of a data record and a record hash (R-HSH) of the data record, the R-ID being uniquely associated with the data record;
   associating, using the one or more processors, the at least one of the data record, the R-ID, the R-HSH and a client signature with a unique identifier (B-ID) of a location within an immutable storage medium, the client signature based on at least one of the client signing key and the client verification key;
   generating, using the one or more processors, an authentication seal based at least in part upon the at least one of the data record and the R-ID, the R-HSH and the B-ID; and
   receiving, from the client agent, an audit request in verification of the authentication seal in association with the data record.

7. The computer usable program product of claim 6, wherein the R-ID comprises a Nonce (Number Used Once) Identifier.

8. The computer usable program product of claim 7, wherein the B-ID comprises at least one of a unique index, a pointer and an offset to a location within immutable storage medium.

9. The computer usable program product of claim 8, the instructions when executed in the one or more processors causing operations further comprising transmitting the authentication seal back to the client agent for at least one of storage and verification.

10. The computer usable program product of claim 6, wherein the immutable medium comprises at least one of a private and a public blockchain.

11. The computer usable program product of claim 6, wherein the stored program instructions are stored in a computer-readable storage medium in a data processing system, and wherein the stored program instructions are transferred over a network from a remote data processing system.

12. The computer usable program product of claim 6, wherein the stored program instructions are stored in a computer-readable storage medium in a server data processing system, and wherein the stored program instructions are downloaded over a network to a remote data processing system for use in a computer-readable storage medium associated with the remote data processing system, further comprising:
   program instructions to meter usage of computer usable code in response to a request for the usage; and
   program instructions to generate an invoice based on the metered usage.

13. A computer system comprising one or more processors, one or more computer-readable memories, one or more computer-readable storage devices, and program instructions stored on at least one of the one or more storage devices for execution by at least one of the one or more processors via at least one of the one or more memories, the program instructions when executed in the one or more processors causing operations comprising:
   receiving, from a client agent having an associated client signing key and client verification key, at a memory of an authentication agent server computing device, a data record submittal including at least an identifier (R-ID) and at least one of a data record and a record hash (R-HSH) of the data record, the R-ID being uniquely associated with the data record;
   associating, using the one or more processors, the at least one of the data record, the R-ID, the R-HSH and a client signature with a unique identifier (B-ID) of a location within an immutable storage medium, the client signature based on at least one of the client signing key and the client verification key;
   generating, using the one or more processors, an authentication seal based at least in part upon the at least one of the data record and the R-ID, the R-HSH and the B-ID; and receiving, from the client agent, an audit request in verification of the authentication seal in association with the data record.

14. The computer system of claim 13, wherein the R-ID comprises a Nonce (Number Used Once) Identifier.

15. The computer system of claim 14, wherein the B-ID comprises at least one of a unique index, a pointer and an offset to a location within immutable storage medium.

16. The computer system of claim 15, the program instructions when executed in the one or more processors causing operations comprising transmitting the authentication seal back to the client agent for at least one of storage and verification.

17. The computer system of claim 13, wherein the immutable medium comprises at least one of a private and a public blockchain.

* * * * *